United States Patent [19]

Zeidler

[11] Patent Number: 4,729,582
[45] Date of Patent: Mar. 8, 1988

[54] PIPE COUPLING

[75] Inventor: Siegmund Zeidler, Hanau, Fed. Rep. of Germany

[73] Assignee: Rasmussen GmbH, Maintal, Fed. Rep. of Germany

[21] Appl. No.: 883,072

[22] Filed: Jul. 8, 1986

[30] Foreign Application Priority Data

Jul. 10, 1985 [DE] Fed. Rep. of Germany ....... 3524621

[51] Int. Cl.[4] .............................................. F16L 37/18
[52] U.S. Cl. .................................... 285/104; 285/305; 285/373; 285/383
[58] Field of Search ............... 285/373, 372, 369, 419, 285/104, 305, 383

[56] References Cited

U.S. PATENT DOCUMENTS

| 1,930,194 | 10/1933 | Dillon . | |
|---|---|---|---|
| 2,005,056 | 6/1935 | Stephens | 285/369 X |
| 2,182,797 | 12/1939 | Dillon . | |
| 2,570,224 | 10/1951 | Fason | 285/369 X |
| 3,017,204 | 1/1962 | Smith | 285/104 X |
| 3,915,480 | 10/1975 | Kish et al. | 285/369 X |

FOREIGN PATENT DOCUMENTS

| 1958205 | 5/1971 | Fed. Rep. of Germany | 285/104 |
|---|---|---|---|
| 2428101 | 10/1983 | Fed. Rep. of Germany . | |
| 1112605 | 5/1968 | United Kingdom . | |

Primary Examiner—Dave W. Arola
Attorney, Agent, or Firm—Peter K. Kontler

[57] ABSTRACT

A coupling for the plain ends of two pipes has a tubular housing with two flange-like end portions which extend radially inwardly toward the ends of the respective pipes. The housing contains two sets of externally toothed blocking elements each of which has an oval outline and is compelled to roll in the axial direction of the pipes when at least one of the pipes is moved axially and away from the other pipe. Each set surrounds one of the pipes and the blocking elements are rotatable on the respective end portions of the housing or on annular carriers in the housing. The blocking elements of each set can rotate relative to each other and their teeth penetrate into the housing and/or into the respective pipes in response to movement of one of the pipes away from the other pipe.

19 Claims, 7 Drawing Figures

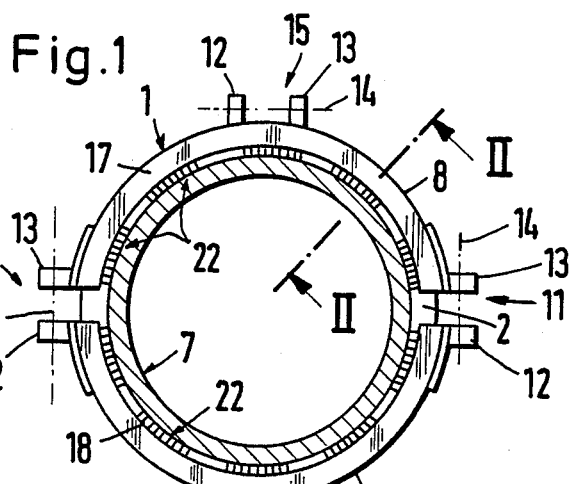
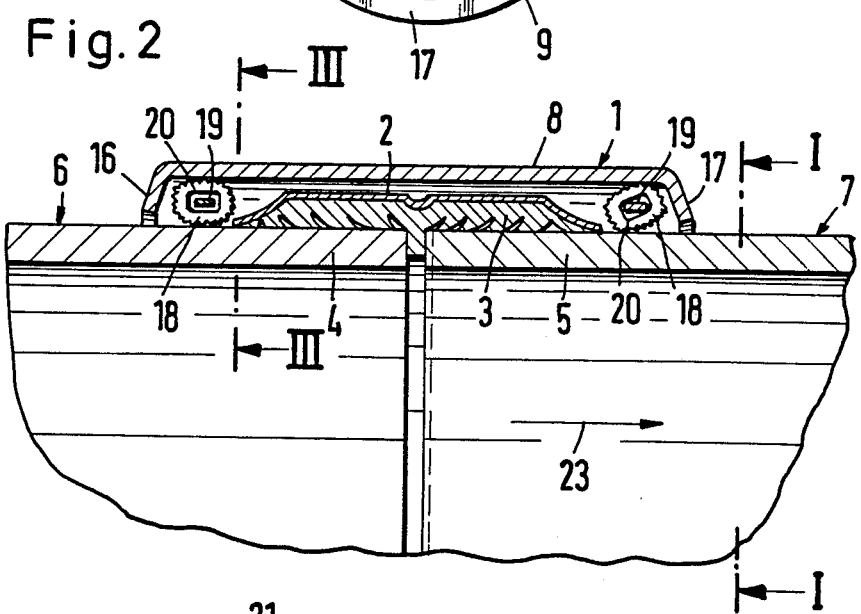
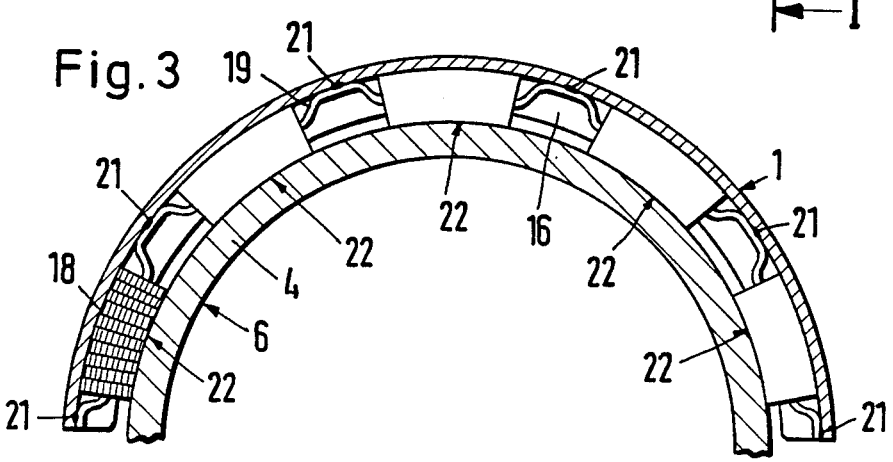

PIPE COUPLING

BACKGROUND OF THE INVENTION

The invention relates to improvements in couplings for plain end pipes, and more particularly to improvements in pipe couplings of the type wherein a tubular housing has two flange-like end portions each of which surrounds the plain end of one of the pipes and the housing contains two sets of toothed blocking elements which are rotatable in response to axial movement of at least one of the pipes away from the other pipe and serve to oppose separation of the pipes.

German Pat. No. 24 28 101 discloses a pipe coupling wherein the plain ends of the pipes are surrounded by a tubular housing having two flange-like end portions which extend radially inwardly toward the peripheries of the respective pipes. The coupling further comprises two blocking devices each of which surrounds the end of one of the pipes and is disposed in the interior of the housing. Each blocking device has several claws which penetrate into the peripheral surfaces of the respective pipes when the pipes are moved axially and away from each other. The blocking devices have rings with a substantially frustoconical cross sectional outline, and the rings are tiltable in the interior of the housing. That marginal portion of each ring which has a relatively small diameter is provided with axially extending slots to form laminations constituting the aforementioned claws. The neighboring laminations overlap each other and can penetrate into the material of the adjacent pipe end in response to movement of the pipes away from each other. The conical portion of each ring changes its angular position in response to a pull upon one of the pipes so that the claws penetrate into the material of the pipes and tend to prevent further axial displacement of the pipes away from each other. A drawback of the patented blocking device is that the entire material of each ring must be deformed in order to change the angular positions of the rings in the housing. This necessitates the exertion of a substantial bending moment and, as a rule, a substantial axial displacement of at least one of the pipes before the blocking devices become effective. The force which causes the rings to change their angular positions becomes effective only when substantial quantities of the material of the pipes accumulate in front of the respective claws.

U.S. Pat. No. 1,930,194 to Dillon discloses a pipe coupling wherein the blocking elements constitute substantially segment-shaped parts which are tiltable in the interior of the housing of the coupling between two spaced-apart angular positions determined by the internal surfaces of the adjacent portions of the housing. Each set of segment-shaped blocking elements is tiltable about a fixed axis defined by a ring-shaped shaft which is mounted in the housing. Those portions of the blocking elements which are adjacent to the peripheral surfaces of the respective pipes have teeth which penetrate into the adjacent material in response to a pull upon the pipes in a direction to move them apart. The teeth are provided on circular surfaces having their centers on the respective ring-shaped shafts. A drawback of the patented pipe coupling is that the force with which the blocking elements hold the pipes against separation does not increase, or decreases only insignificantly, in response to a pull upon the one or the other pipe in a direction to separate the pipes from each other.

U.S. Pat. No. 2,005,056 to Stephens discloses a pipe coupling wherein the blocking elements are rollers having circumferentially extending teeth and being rotatable about axes which are parallel to the common axis of the pipes. The patentee states that the roller-shaped blocking elements are sluggishly rotatable in response to the application of a force tending to separate the pipes from each other. Such sluggish rotatability does not prevent pronounced axial movements of the pipes away from each other.

British Pat. No. 1,112,605 to Barr discloses a pipe coupling wherein the housing of the coupling confines a ring-shaped rubber body with wires incorporated therein. The pipes which are to be coupled to each other are inserted into one another, and a single rubber body is placed between the external surface of the inserted pipe and the internal surface of the surrounding pipe. The rubber body performs the function of a seal. The pipes which are to be coupled by the rubber body must be provided with internal and external grooves for reception of portions of the rubber body.

U.S. Pat. No. 2,182,797 to Dillon discloses a further pipe coupling which comprises sprag-like blocking elements disposed between a surrounding pipe and a surrounded pipe and being active only as long as one of the pipes is pulled axially away from the other pipe. The sprags resemble spheres and are unlikely to invariably oppose axial movements of the two pipes away from each other. Such sprags must be inserted into specially configured internal grooves of the outer pipe. The patented coupling is expensive and unreliable, especially if the pipes which are coupled to each other are not continuously stressed in a direction to move axially and away from each other.

OBJECTS AND SUMMARY OF THE INVENTION

An object of the invention is to provide a pipe coupling wherein the blocking elements are constructed and mounted in such a way that they are capable of immediately reacting to any axial movement of at least one of the plain-end pipes away from the other pipe.

Another object of the invention is to provide novel and improved blocking elements for use in the above outlined pipe coupling.

A further object of the invention is to provide a simple, compact and inexpensive coupling which can be used in connection with large- or small-diameter plain end pipes.

An additional object of the invention is to provide a pipe coupling which can readily withstand pronounced and even very large forces tending to separate pairs of plain-end pipes from each other.

Still another object of the invention is to provide a pipe coupling wherein the tubular housing can directly support a requisite number of blocking elements which oppose separation of the pipes from each other.

The invention resides in the combination with two plain end pipes of a coupling which comprises a tubular housing surrounding the ends of the pipes and having substantially flange-like first and second end portions each of which extends substantially radially inwardly toward the periphery of one of the pipes, and first and second sets of externally toothed blocking elements which are provided in and are rotatable relative to the housing adjacent the first and second end portions, respectively. The blocking elements of each set are further rotatable relative to each other to roll axially of the respective pipes, and each blocking element has a substantially oval outline. The external teeth of each blocking element engage the periphery of the corresponding pipe so as to compel the blocking element to turn in response to axial movement of at least one of the pipes relative to the other pipe whereby the teeth of the blocking element penetrate into the housing as well as into the corresponding pipe.

In accordance with one embodiment of the invention, at least some of the blocking elements can constitute oval rings, and such coupling can further comprise carriers for the blocking elements. The blocking elements can be provided with openings (for example, in the form of rectangular holes), and the carriers extend through the openings of the respective blocking elements. Each carrier can constitute an annulus which extends circumferentially of the corresponding pipe and has portions which are rigid with the housing. Such portions of each carrier can be spaced apart from each other in the circumferential direction of the housing, and groups of blocking elements can be disposed between these portions of the respective carriers.

As mentioned above, the openings can constitute polygonal holes and the carriers can include strips which extend through the holes with freedom of movement of the blocking elements relative to the respective carriers. Each blocking element is preferably rotatable, within limits, relative to the respective carrier. This can be readily accomplished by properly selecting the cross-sectional outlines of the carriers and the cross-sectional outlines of the openings or holes in the blocking elements. Spaced-apart portions of the carriers can be welded or otherwise bonded to the housing. The carriers can include a discrete carrier for each set of blocking elements and, as stated above, each carrier can constitute an annulus which surrounds the end of the respective pipe and has an undulate shape with alternating hills bonded to the housing and valleys which are adjacent to the end of the respective pipe. Each set of blocking elements can comprise at least one blocking element for each valley of the respective carrier. The blocking elements of the first and second sets can respectively contact the first and second end portions of the housing.

In accordance with a second embodiment of the invention, at least some of the blocking elements can constitute split rings having a substantially C-shaped cross sectional outline and each having a pair of legs which flank the respective end portion of the housing. One leg of each split ring can abut the housing adjacent the respective end portion of such housing. The legs of each split ring preferably receive the respective end portion of the housing with a predetermined amount of play so that each split ring has limited freedom of angular movement with reference to the respective end portion.

In accordance with a further embodiment of the invention, the blocking elements can constitute arcuate sections and the coupling further comprises relatively narrow and twistable webs which connect the neighboring sections to each other. At least some of the webs can be bonned to the housing.

Each set of blocking elements can comprise two or more annuli of blocking elements which surround the ends of the corresponding pipes.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a transverse sectional view of a pipe coupling which embodies one form of the invention, the section being taken in the direction of arrows from the line I—I in FIG. 2;

FIG. 2 is an enlarged fragmentary axial sectional view as seen in the direction of arrows from the line II—II of FIG. 1;

FIG. 3 is a fragmentary transverse sectional view as seen in the direction of arrows from the line III—III of FIG. 2;

DESCRIPTION OF THE PREFERRED EMBODIMENTS

Figure 4:
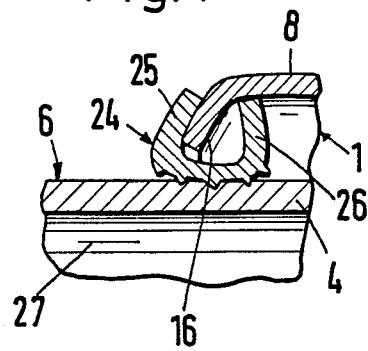
FIG. 4 is a fragmentary transverse sectional view of a modified pipe coupling, showing one of the blocking elements in a first position.

FIGS. 1 to 3 show a first coupling which can be used to connect the plain ends 4, 5 of two coaxial pipes 6, 7. The coupling comprises a tubular housing 1 having two flange-like end portions 16, 17 which extend substantially radially inwardly toward the ends 4, 5 of the respective pipes 6 and 7. The housing 1 spacedly surrounds a casing 2 for a deformable elastic sealing ring 3 which has internal sealing lips and is slipped onto the ends 4 and 5 so that its central portion extends radially inwardly and is confined between the end faces of the two pipes. The sealing ring 3 and the casing 2 will be used alone (i.e., without the coupling which includes the housing 1) if the pressure in the pipes 6, 7 is relatively low and the coupling must resist relatively small radial and/or axial forces which tend to move one of the pipes 6, 7 away from the other pipe.

The housing 1 comprises two semicylindrical sections or shells 8, 9 whose axially parallel marginal portions are respectively provided with radially outwardly extending lugs 13, 12 which are separably connected to each other by fasteners 10 and 11 each including a row of bolts 14 and nuts (not shown) or a row of screws.

The casing 2 is a split cylinder (i.e., it has a substantially C-shaped cross-sectional outline) with two radially outwardly extending lugs 12, 13 which are secured to each other by bolts 14 and nuts (not shown) or by screws. The lugs 12, 13 of the casing 2 extend radially outwardly through a suitable window of the shell 8. If desired, the casing 2 can be assembled of two or more trough-shaped sections similar to the shells 8, 9 of the housing 1.

The coupling which includes the housing 1 further comprises two sets of blocking elements 18 which are formed with external teeth or claws (hereinafter called teeth) and each of which has a substantially oval outline. The blocking elements 18 of the coupling which is shown in FIGS. 1 to 3 are rings each of which has an opening 20 in the form of a polygonal (rectangular)

hole. The blocking elements 18 of one set are inwardly adjacent the end portion 16, and the blocking elements 18 of the other set are inwardly adjacent the end portion 17 of the housing 1.

The blocking elements 18 of each set are mounted on a discrete annular carrier 19 in the form of a meandering strip which surrounds the respective pipe 6 or 7. The width of each strip-shaped carrier 19 (as measured in the axial direction of the pipes 6, 7) exceeds the smaller dimension of the opening 20 in the respective blocking element 18 but is less than the longer dimension of the respective opening 20. This can be readily seen in FIG. 2. The teeth of each blocking element 18 contact the external surface of the respective pipe 6, 7 as well as the internal surface of the housing 1 adjacent the corresponding end portion 16 or 17. When the pipes 6 and 7 are not pulled apart (in and/or counter to the direction of arrow 23 shown in FIG. 2), the blocking elements 18 assume angular positions corresponding to that of the blocking element which is shown in the left-hand portion of FIG. 2. As mentioned above, each blocking element 18 has a substantially oval outline. This means that the outline of each blocking element 18 constitutes or can resemble a portion of or a complete ellipse. The outline of each blocking element 18 can be a composite outline consisting of two portions of smaller-diameter circles and two portions of larger-diameter circles with gradual transition between the neighboring portions.

FIG. 3 shows that each carrier 19 has hills which alternate with valleys and that at least some of the hills are bonded (preferably welded) to the internal surface of the housing 1 by spot welds 21. The valleys carry groups 22 of blocking elements 18 which can rotate relative to each other as well as relative to the housing 1 and the respective pipes 6 and 7.

When the pipe 7 is pulled in a direction to the right as seen in FIG. 2 (note the arrow 23), the corresponding set of blocking elements 18 turns around the valleys of the corresponding strip shaped meandering carrier 19 to assume the positions shown in the right-hand portion of FIG. 2. Thus, some external teeth of the right-hand blocking elements 18 bite, or bite deeper, into the material of the end portion 5 of the pipe 7, and some teeth of the right-hand blocking elements 18 bite, or bite deeper, into the internal surface of the housing 1 adjacent the corresponding end portion 17. Even a very small axial displacement of the pipe 7 (for example, to the broken-line position of FIG. 2) suffices to change the angular positions of the corresponding blocking elements 18 so that the improved pipe coupling reacts practically instantaneously to oppose further movement of the pipes 6 and 7 away from each other. The right-hand blocking elements 18 tend to rotate in a counterclockwise direction, as seen in FIG. 2. The play with which the carriers 19 are received in the openings 20 of the respective blocking elements 18 can be readily selected in such a way that the angular movability of blocking elements 18 relative to the corresponding carriers 19 suffice to ensure positive retention of the pipes 6 and 7 against excessive axial displacement away from each other. As shown in the right-hand portion of FIG. 2, the maximum angular displacement of blocking elements 18 relative to the corresponding carriers 19 need not exceed 90° in either direction.

When the right-hand blocking elements 18 of FIG. 2 cannot rotate any longer about the corresponding carrier 19, the pipe 7 (which is assumed to continue to move axially in the direction of arrow 23) entrains the housing 1 in a direction to the right whereby the housing turns the left-hand blocking elements 18 in a clockwise direction so that such blocking elements bite deeper into the material of the pipe end 4 as well as into the internal surface of the left-hand portion of the housing 1 adjacent the end portion 16 with the result that the shifting of the pipe 7 relative to and away from the pipe 6 is terminated.

The mode of operation of the two sets of blocking elements 18 is analogous if the pipe 6 is pulled in a direction to the left as seen in FIG. 2 or if the pipes 6 and 7 are simultaneously moved axially and away from each other.

The feature that the carriers 19 are received in the openings 20 of the respective sets of blocking elements 18 with a certain amount of play ensures that the carriers do not oppose initial angular displacements of the corresponding blocking elements 18 which, in turn, ensures that the blocking elements 18 can move into positive engagement with the adjacent surfaces of the corresponding pipes and the respective portions of the housing 1 to prevent any extensive axial displacement of the pipes away from each other. The arrangement is such that, at least during the initial stage of rotation of the blocking elements 18 relative to the corresponding carriers 19, the carriers do not offer any appreciable resistance to such rotation of the blocking elements. When the teeth of the blocking elements 18 have penetrated into the adjacent surfaces of the pipes and into the housing 1, the carriers 19 cooperate with the ends 4, 5 and with the housing 1 to prevent further angular displacements of the blocking elements 18 in a direction to allow further separation of the pipes 6 and 7 axially and away from each other.

An important advantage of the coupling which is shown in FIGS. 1 to 3 is that it need not employ elastically or otherwise deformable blocking elements. Therefore, such blocking elements can stand long periods of use and they can oppose separation of the pipes with a substantial force. Moreover, the oval design of the blocking elements 18 ensures that they react practically instantaneously to all, even very minor, axial displacements of the pipes 6 and 7 in a direction axially of and away from each other. Each blocking element 18 can constitute a relatively narrow ring (see the left-hand portion of FIG. 3), and the rings 18 of each group 22 are free to rotate relative to each other. It is clear that the housing 1 can confine four or more sets of blocking elements 18, for example, two sets adjacent to the end portion 16 on the end 4 of the pipe 6 and two sets adjacent the end portions 17 on the end 5 of the pipe 7. Individual blocking elements 18 are preferably disposed in planes which include the common axis of the pipes 6 and 7.

If the elliptical outline of each blocking element 18 is assembled of arcuate circular sections which merge gradually into each other, the longer or major axes of the ellipses are parallel to the common axis of the pipes 6 and 7. An axial shifting of the pipe 6 and/or 7 entails a change in the inclination of the major axes of the blocking elements 18 from the position shown in the left-hand portion of FIG. 2, either in a clockwise or in a counterclockwise direction. The inclination of the major axes of the ellipses changes continuously as long as at least one of the pipes 6, 7 is pulled away from the other pipe so as to ensure that the blocking elements 18 offer a progressively increasing resistance against further axial separation of the pipes. The hills of the meandering annular carriers 19 preferably abut the internal surface of the housing 1, and the valleys of such carriers are preferably spaced apart from the external surfaces of the respective pipes so as to provide room for the mounting of groups 22 of blocking elements 18 in a manner as shown in the left-hand portion of FIG. 3. Each carrier 19 can constitute a metallic strip. The same applies for the material of the housing 1 and casing 2. However, it is equally within the purview of the invention to utilize plastic components including the casing 2 and the housing 1. The number of spot welds 21 between the carriers 19 and the housing 1 can be reduced below or increased above the number shown in FIG. 3. It normally suffices to provide a relatively small number of hills so as to allow for the assembly of relatively large groups 22 of neighboring blocking elements 18.

If desired, the two sets of blocking elements 18 can be placed into immediate or close proximity of the inner sides of the respective end portions 16, 17 of the housing 1 so that such end portions prevent excessive rotation of the blocking elements 18 on the corresponding carriers 19. It is even possible to avoid actual welding of the carriers 19 to the housing 1 and to rely exclusively on the end portion 16 and 17 to maintain the corresponding sets of blocking elements 18 in proper positions as considered in the axial direction of the housing 1.

The number of sets of blocking elements 18 depends on the dimensions of the blocking elements and on the anticipated magnitude of forces which the blocking elements must resist in order to prevent excessive axial shifting of the pipes 6 and 7 axially of and away from each other. The blocking elements 18 cooperate with the housing 1 to prevent excessive (or any) tilting of the pipes 6 and 7 relative to each other.

Figure 5:
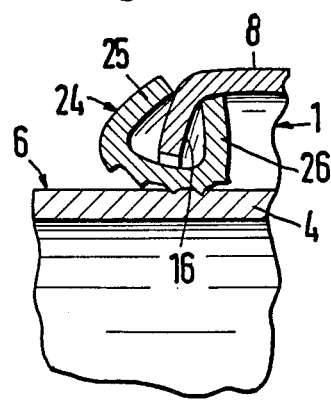
FIG. 5 illustrates the structure of FIG. 4 but with the blocking element in a different position.
Figure 6:
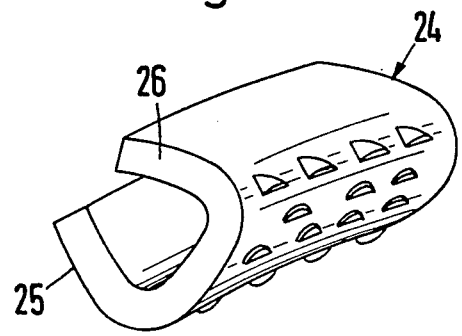
FIG. 6 is a perspective view of a blocking element which can be used in the pipe coupling of FIGS. 4–5.

FIGS. 4 to 6 show a portion of a modified pipe coupling wherein the housing 1 is or can be identical with the housing 1 of FIGS. 1 to 3. The carriers 19 are omitted and the blocking elements 18 are replaced with C-shaped blocking elements 24 in the form of elongated split rings (see particularly FIG. 6). At least a portion of each blocking element 24 has a substantially oval outline and those portions of the external surfaces of the blocking elements 24 which are adjacent to the external surfaces of the respective pipes (FIGS. 4 and 5 show the end 4 of the pipe 6) are provided with rows of external teeth which can bite into the material of the pipe end 4. The end portion 16 of the housing 1 constitutes a carrier for one set of blocking elements 24 and such end portion 16 is flanked by the legs 25, 26 of the respective blocking elements 24 with a certain amount of play so as to enable the blocking elements 24 to turn from the positions of FIG. 4 to the positions of FIG. 5 in response to a pull upon the pipe 6 in the direction of the arrow 27. The angular displacement of the blocking elements 24 is terminated when the free ends of the legs 25, 26 abut the respective external and internal surfaces of the end portion 16 in a manner as shown in FIG. 5. The construction of the blocking elements 24 of the other set (mounted on the non-illustrated end portion 17 of the housing 1) is identical with the configuration of the blocking element 24 of FIG. 6. The blocking elements of the right-hand set are mirror images of the blocking elements of the set on the end portion 16 of the housing 1. Each of the two end portions of the housing 1 can carry two, three, four or more preferably uniformly distributed blocking elements 24.

An advantage of the coupling which is shown in FIGS. 4 to 6 is its simplicity. Thus, each set can comprise a relatively small number of blocking elements 24, and it is not necessary to provide discrete carriers because the function of the carriers 19 of FIGS. 1 to 3 is taken over by the end portions of the housing 1.

Figure 7:
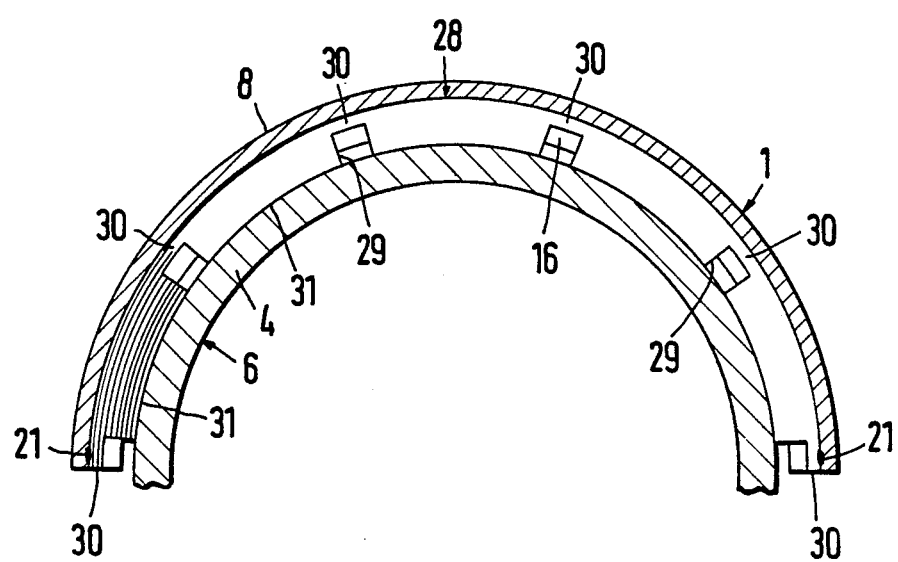
FIG. 7 is a fragmentary transverse sectional view of a third pipe coupling.

FIG. 7 shows a portion of a further pipe coupling which comprises two sets of blocking elements 31 constituting arcuate portions of two wires 28 (one shown) having a substantially oval cross-sectional outline. Each wire has circumferentially extending teeth which, for the sake of simplicity, are shown only in the left-hand portion of FIG. 7. Furthermore each wire 28 has a set of recesses or cutouts 29 which are provided in its internal surface so as to define webs 30 which are flexible and capable of being twisted so as to allow for angular movements of neighboring blocking elements 31 relative to each other. The depth of the recesses 29 will determine the flexibility of the respective webs 30 and the extent to which the neighboring blocking elements 31 are movable relative to each other. The teeth of the blocking elements 31 can bite into the internal surface of the housing 1 as well as into the external surfaces of the respective pipes. FIG. 7 merely shows the shell 8 of the housing 1 and the end 4 of the pipe 6. Each set of blocking elements 31 can be assembled of two halves and each half can comprise a total of, for example, five arcuate blocking elements. At least the two diametrically opposite webs 30 of each set of blocking elements 31 can be welded to the housing 1, as at 21.

The mode of operation of blocking elements 31 is analogous to that of the blocking elements 18 or 24. The difference is that the neighboring blocking elements 31 are integrally connected to each other. The pipe coupling of FIG. 7 also does not require discrete carriers because the webs 30 can be said to perform the function of the carriers 19. The housing 1 can receive four or more sets of blocking elements 31, for example, two sets adjacent to its end portion 16 and two sets adjacent to its end portion 17.

It is further clear that the illustrated recesses 29 can be replaced with annular grooves which are machined or otherwise formed in the periphery of the wire 28. The webs 30 are then spaced apart from the internal surface of the housing 1. The centrally located webs are even more readily twistable than the webs which are shown in FIG. 7 adjacent to the internal surface of the housing 1.

Each wire 28 is welded to the internal surface of the shell 8 or 9 before the shells are assembled to form the housing 1. Each shell contains at least two semicircular wires 28.

An advantage of the coupling of FIG. 7 is its simplicity. Thus, such coupling comprises a very small number of parts, namely a housing, as few as two wires 28 adjacent to one axial end of the housing and as few as two wires 28 adjacent to the other axial end of the housing. As mentioned above, each end portion of the housing 1 can accommodate two or more sets of blocking elements in the form of the wire-like blocking elements 31 or blocking elements 18 of the type shown in FIGS. 1 to 3. Furthermore, blocking elements 24 of the type shown in FIGS. 4 to 6 can be used jointly with blocking elements 31 and/or 18.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. The combination with two plain end pipes having a first hardness of a coupling comprising a tubular housing surrounding the ends of the pipes and having first and second portions each adjacent the periphery of one of the pipes; and first and second sets of externally toothed blocking element provided in and contacting said housing adjacent said first and second portions, respectively, said sets of blocking elements being rotatable relative to each other axially of the respective pipes and each of said elements having a substantially oval outline and its external teeth having a second hardness at least matching said first hardness, said external teeth of each set of blocking elements engaging the periphery of the corresponding pipe and the outlines of said elements having major axes which are normally substantially parallel to the axis of said tubular housing so that the blocking elements of at least one set are compelled, as a result, of engagement of their teeth with said housing and the respective pipe, to turn in response to axial movement of at least one of the pipes relative to the other pipe whereby the teeth of the at least one set of blocking elements penetrate into the corresponding pipe.

2. The combination of claim 1, wherein at least some of said blocking elements are oval rings, and further comprising carriers for said elements, said elements having openings and said carriers extending through the openings of the respective elements.

3. The combination of claim 2, wherein said carriers are annuli extending circumferentially of the corresponding pipes and having portions rigid with said housing.

4. The combination of claim 2, wherein said openings are polygonal hcles and said carriers include strips which extend through said holes with freedom of movement of said elements relative to the respective carriers, each of said elements being rotatable within limits with reference to the respective carrier.

5. The combination of claim 2, wherein said carriers have spaced-apart portions which are bonded to the housing.

6. The combination of claim 2, wherein said carriers include a discrete carrier for each set of blocking elements and each carrier is an annulus surrounding the end of the respective pipe and having an undulate shape with alternating hills bonded to said housing and valleys adjacent the end of the respective pipe.

7. The combination of claim 1, wherein at least some of said blocking elements are split rings each having a pair of legs flanking the respective portion of said housing.

8. The combination of claim 7, wherein one leg of each of said split rings abuts the housing adjacent the respective portion of said housing.

9. The combination of claim 7, wherein the legs of each of said split rings receive the respective portion of said housing with a predetermined amount of play so that each split ring has limited freedom of angular movement with reference to the respective portion.

10. The combination of claim 1, wherein said blocking elements comprise neighboring arcuate sections and webs connecting the neighboring sections to each other.

11. The combination of claim 10, wherein at least some of said webs are bonded to said housing.

12. The combination of claim 1, wherein each set comprises several annuli of blocking elements surrounding the ends of the corresponding pipes.

13. The combination of claim 1, wherein said first and second portions constitute the end portions of said housing and each thereof extends substantially radially inwardly toward the periphery of one of the pipes.

14. The combination with two plain end pipes having a first hardness of a coupling comprising a tubular housing surrounding the ends of the pipes and having substantially flange-like first and second end portions each extending substantially radially inwardly toward the periphery of one of the pipes; first and second sets of externally toothed blocking elements provided in and rotatable relative to said housing adjacent said first and second end portions, respectively, and rotatable relative to each other axially of the respective pipes, each of said elements having a substantially oval outline and its external teeth having a second hardness at least matching said first hardness, said external teeth engaging said housing and the periphery of the corresponding pipe so as to compel the blocking elements to turn in response to axial movement of at least one of the pipes relative to the other pipe whereby the teeth penetrate into the corresponding pipe, at least some of said blocking elements constituting oval rings having openings; and carriers for said elements, said carriers constituting annuli extending through the openings of the respective elements and circumferentially of the corresponding pipes and having portions rigid with said housing.

15. The combination of claim 14, wherein said portions of said carriers are spaced apart from each other in the circumferential direction of said housing and said elements are disposed between said portions of the respective carriers.

16. The combination with two plain end pipes having a first hardness of a coupling comprising a tubular housing surrounding the ends of the pipes and having substantially flange-like first and second end portions each extending substantially radially inwardly toward the periphery of one of the pipes; first and second sets of externally toothed blocking elements provided in and rotatable relative to said housing adjacent said first and second end portions, respectively, and rotatable relative to each other axially of the respective pipes, each of said elements having a substantially oval outline and its external teeth having a second hardness at least matching said first hardness, said external teeth engaging said housing and the periphery of the corresponding pipe so as to compel the blocking elements to turn in response to axial movement of at least one of he pipes relative to the other pipe whereby the teeth penetrate into the corresponding pipe, at least some of said blocking elements constituting oval rings having polygonal holes; and carriers for said elements, said carriers including strips extending through said holes of the respective elements with freedom of movement of said elements relative to the respective carriers, each of said oval rings being rotatable within limits with reference to the respective carrier.

17. The combustion with two two plain end pipes having a first hardness of a coupling comprising a tubular housing surrounding the ends of the pipes and having substantially flange-like first and second end portions each extending substantially radially inwardly toward the periphery of one of the pipes; first and second sets of externally toothed blocking elements provided in and rotatable relative to said housing adjacent said first and second end portions, respectively, and rotatable relative to each other axially of the respective pipes, each of said elements having a substantially oval outline and its external teeth having a second hardness at least matching said first hardness, said external teeth engaging said housing and the periphery of the corresponding pipe so as to compel the blocking elements to turn in response to axial movement of at least one of the pipes relative to the other pipe whereby the teeth penetrate into the corresponding pipe, at least some of said blocking elements constituting oval rings having openings; and carriers for said elements, said carriers extending throuqh the openings of the respective elements and having spaced-apart portions bonded to said housing.

18. The combination with two plain end pipes having a first hardness of a coupling comprising a tubular housing surrounding the ends of the pipes and having substantially flange-like first and second end portions each extending substantially radially inwardly toward the periphery of one of the pipes; first and second sets of externally toothed blocking elements provided in and rotatable relative to said housing adjacent said first and second end portions, respectively, and rotatable relative to each other axially of the respective pipes, each of said elements having a substantially oval outline and its external teeth having a second hardness at least matching said first hardness, said external teeth engaging said housing and the periphery of the corresponding pipe so as to compel the blocking elements to turn in response to axial movement of at least one of the pipes relative to the other pipe whereby the teeth penetrate into the corresponding pipe, at least some of said blocking elements constituting oval rings having openings; and carriers for said elements, said carriers extending through the openings of the respective elements and including a discrete carrier for each set of blocking elements, each carrier constituting an annulus surrounding the end of the respective pipe and having an undulate shape with alternating hills bonded to said housing and valleys adjacent the end of the respective pipe.

19. The combination of claim 18, wherein each set of blocking elements comprises at least one blocking element for each valley of the respective carrier.

* * * * *